(12) United States Patent
Lean et al.

(10) Patent No.: US 8,179,895 B2
(45) Date of Patent: May 15, 2012

(54) METHODS, SYSTEMS, AND COMPUTER PROGRAM PRODUCTS FOR MONITORING TUNNELED INTERNET PROTOCOL (IP) TRAFFIC ON A HIGH BANDWIDTH IP NETWORK

(75) Inventors: Yoogin Lean, Apex, NC (US); Philippe Besset, Rixheim (FR); William Salvin, Spechbach le bas (FR); Amit H. Chatterjee, Apex, NC (US)

(73) Assignee: Tekelec, Morrisville, NC (US)

( * ) Notice: Subject to any disclaimer, the term of this patent is extended or adjusted under 35 U.S.C. 154(b) by 323 days.

(21) Appl. No.: 11/888,628

(22) Filed: Aug. 1, 2007

(65) Prior Publication Data

US 2008/0031141 A1 Feb. 7, 2008

Related U.S. Application Data

(60) Provisional application No. 60/834,852, filed on Aug. 1, 2006.

(51) Int. Cl.
*H04L 12/56* (2006.01)
(52) U.S. Cl. .................... 370/392; 370/395.52; 370/401
(58) Field of Classification Search .................... None
See application file for complete search history.

(56) References Cited

U.S. PATENT DOCUMENTS

| | | | |
|---|---|---|---|
| 7,023,838 B1 * | 4/2006 | Hahn et al. .................... | 370/352 |
| 7,626,938 B1 * | 12/2009 | Orr et al. ....................... | 370/251 |
| 7,797,411 B1 * | 9/2010 | Guruswamy et al. ......... | 709/223 |
| 7,865,944 B1 * | 1/2011 | Shu et al. ........................ | 726/11 |
| 2003/0016679 A1 * | 1/2003 | Adams et al. ................. | 370/401 |
| 2003/0026257 A1 * | 2/2003 | Xu et al. ........................ | 370/392 |
| 2004/0170133 A1 * | 9/2004 | Oguchi et al. ................ | 370/299 |
| 2004/0184440 A1 * | 9/2004 | Higuchi et al. ............... | 370/349 |
| 2004/0264405 A1 * | 12/2004 | MacGregor Scobbie ..... | 370/328 |
| 2005/0041584 A1 * | 2/2005 | Lau et al. ....................... | 370/235 |
| 2007/0091862 A1 * | 4/2007 | Ioannidis ....................... | 370/338 |
| 2007/0121615 A1 * | 5/2007 | Weill et al. .................... | 370/389 |
| 2007/0226374 A1 * | 9/2007 | Quarterman et al. ......... | 709/250 |

OTHER PUBLICATIONS

"GPRS Tunneling Protocol (GTP)," Trillium, Continuous Computing, pp. 1-3 (Copyright 2007).

"Digital Cellular Telecommunications System (Phase 2+); General Packet Radio Service (GPRS): GPRS Tunnelling Protocol (GTP) Across the Gn and Gp Interface (3GPP TS 09.60 version 7.6.0 Release 1998)", ETSI TS 101 347, pp. 1-67 (Sep. 2000).

* cited by examiner

*Primary Examiner* — Gregory Sefcheck
*Assistant Examiner* — Daniel Mitchell
(74) *Attorney, Agent, or Firm* — Jenkins, Wilson, Taylor & Hunt, P.A.

(57) ABSTRACT

Methods, systems, and computer program products for monitoring tunneled Internet protocol (IP) traffic on a high bandwidth IP network are disclosed. According to one method, a copy of a tunneled IP packet traversing an IP communications network is generated. The packet may include a payload having tunneled protocol address information. The tunneled protocol address information and the payload portion of the copied IP packet is read. The packet is distributed, using the tunneled protocol address information, to a function for providing at least one of packet classification and network monitoring service for the packet.

21 Claims, 8 Drawing Sheets

| IP PACKET | |
|---|---|
| APPLICATION | HTTP / FTP / SIP / SMTP / etc. |
| PRESENTATION | |
| SESSION | |
| TRANSPORT | TCP / UDP / SCTP<br>*SOURCE PORT*<br>*DESTINATION PORT* |
| NETWORK | IP<br>*SOURCE IP ADDRESS*<br>*DESTINATION IP ADDRESS* |
| DATA LINK | ETHERNET |
| PHYSICAL | TDM, SONET |

312 — APPLICATION
310 — PRESENTATION
308 — SESSION
306 — TRANSPORT
304 — NETWORK
302 — DATA LINK
300 — PHYSICAL

METHODS, SYSTEMS, AND COMPUTER PROGRAM PRODUCTS FOR MONITORING TUNNELED INTERNET PROTOCOL (IP) TRAFFIC ON A HIGH BANDWIDTH IP NETWORK

RELATED APPLICATIONS

This application claims the benefit of U.S. Provisional Patent Application Ser. No. 60/834,852, filed Aug. 1, 2006; the disclosure of which is incorporated herein by reference in its entirety.

TECHNICAL FIELD

The subject matter described herein relates to methods and systems for monitoring IP traffic on a high bandwidth IP network. More particularly, the subject matter described herein relates to includes methods, systems, and computer program products for monitoring tunneled IP traffic on a high-bandwidth IP network.

BACKGROUND

Transmission speeds of communications networks continue to increase, and with this increase, the difficulty to effectively monitor the traffic transmitted over communications networks also increases. Despite these high speeds, it is desirable to monitor signaling message traffic sent over high-speed IP communications networks.

Current IP traffic monitoring systems may include full-duplex taps which copy IP traffic and send the packets to one or more processors for analysis. However, some single current generation processors may not be capable of processing high bandwidth IP traffic streams in real time or near real time, as is necessary for many applications. Thus, some systems split high bandwidth IP streams among a plurality of processors based on each packet's address information. This information can include a packet's source or destination IP address, TCP or UDP port values, or its SCTP information.

Current IP traffic monitoring systems rely upon each monitored packet being uniquely identifiable. In many cases, this is accomplished via each packet's IP and TCP, UDP, or SCTP address information. However, in some networks, signaling message packets are tunneled such that each packet includes the same outer IP address and/or TCP, UDP, or SCTP port information. Accordingly, where tunneling is used, the outer IP addresses and TCP, UDP, or SCTP header information is not usable to segregate traffic into multiple streams. Thus, a single network monitoring processor may be required to process all signaling message packets sent through the same tunnel. This may result in the processor being overwhelmed in current high speed networks.

Accordingly, in light of these difficulties, there exists a need for methods, systems, and computer program products for monitoring tunneled IP traffic on a high bandwidth IP network.

SUMMARY

Methods, systems, and computer program products for monitoring tunneled Internet protocol (IP) traffic on a high bandwidth IP network are disclosed. According to one method, a copy of a tunneled IP packet traversing an IP communications network is generated. The packet may include a payload having tunneled protocol address information. The tunneled protocol address information and the payload portion of the copied IP packet is read. The packet is distributed, using the tunneled protocol address information, to a function for providing at least one of packet classification and network monitoring service for the packet.

The subject matter described herein for monitoring tunneled IP traffic on a high-bandwidth IP network may be implemented using a non-transitory computer program product comprising computer executable instructions embodied in a non-transitory computer readable medium. Exemplary non-transitory computer readable media suitable for implementing the subject matter described herein include chip memory devices, disk memory devices, programmable logic devices, and application specific integrated circuits. In addition, a non-transitory computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
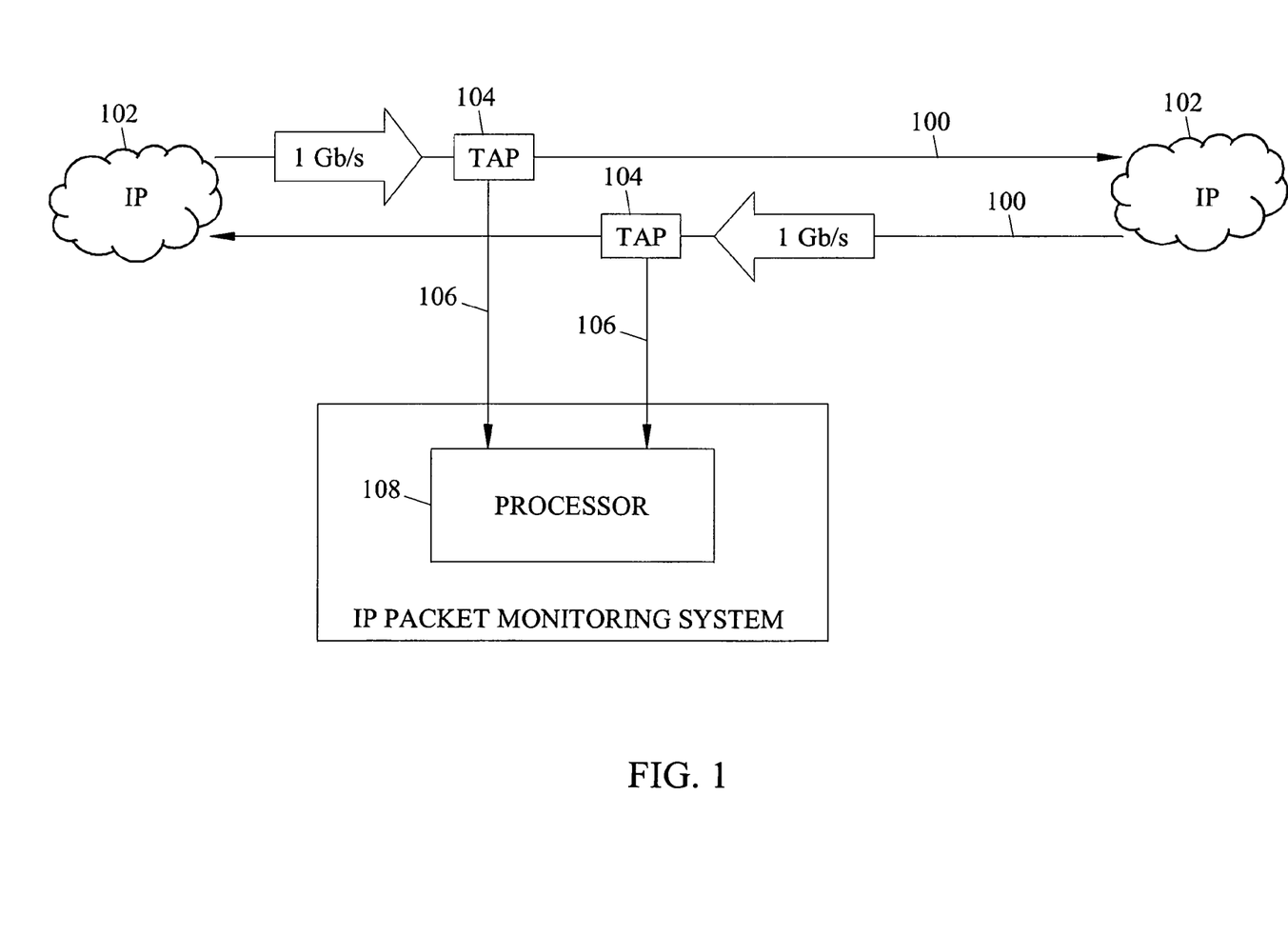
FIG. 1 is a block diagram of a high bandwidth IP network illustrating a tap on each direction of an Ethernet connection where all copied IP packets are directed to a single processor.

FIG. 1 is a block diagram illustrating conventional monitoring of traffic traversing a high bandwidth IP network. In FIG. 1, a full-duplex Ethernet link 100 connects two IP network nodes 102 transmitting IP packets. In the illustrated example, each direction of Ethernet link 100 transmits IP packets at a rate of 1 Gb/s. Both directions of Ethernet link 100 are tapped using taps 104. Each tap 104 passively copies all IP packets transmitted across Ethernet link 100 and sends the IP packet copy stream 106 to processor 108 for analysis. One limitation of the system illustrated in FIG. 1 is that a commercially-feasible implementation of processor 108 may be incapable of analyzing the number of IP packets transmitted via high bandwidth networks in real-time or near real-time.

One potential solution to the high bandwidth monitoring problem illustrated in FIG. 1 is to distribute the monitored packets among multiple processors for processing. Such distribution has conventionally been performed based on the IP addresses, and TCP or UDP port values present in the IP and TCP or UDP headers of the packets.

Figure 2:
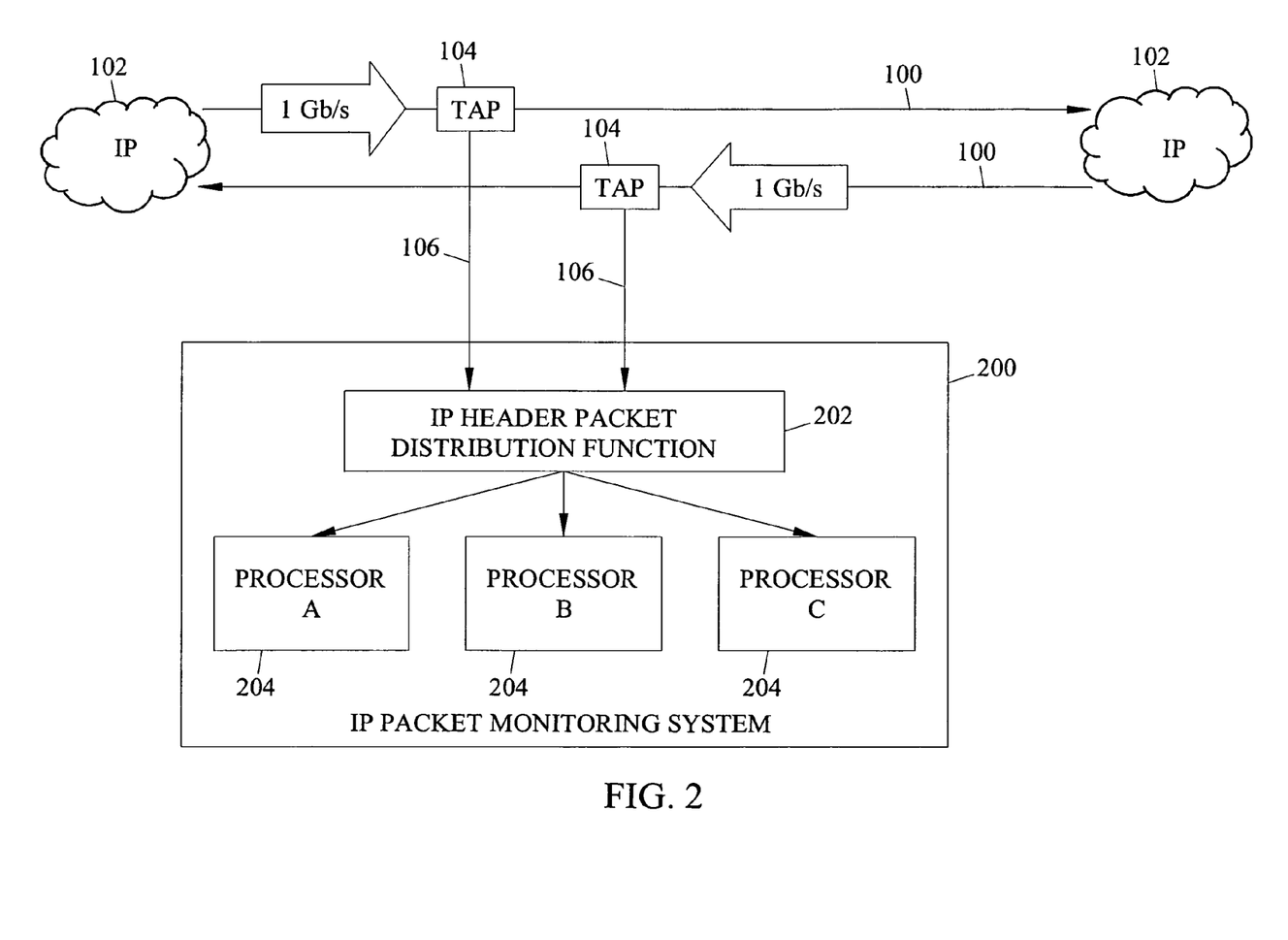
FIG. 2 is a block diagram of a high bandwidth IP network illustrating a tap on each direction of an Ethernet connection wherein the IP packets are split into a plurality of packet streams and distributed among a non-hierarchically structured plurality of processors based on network and transport layer packet header information.

FIG. 2 is a block diagram illustrating a network monitoring system where packets are distributed based on IP, TCP, and UDP header information. Referring to FIG. 2, an IP packet monitoring system 200 includes an IP header packet distribution function 202 for distributing IP packets based on IP, TCP, and UDP header information, and processors 204 for processing packets with different IP, TCP, and UDP header information. As described above with regard to FIG. 1, TAPs 104 copy IP packets traversing high speed Ethernet connections 100. TAPs 104 forward the copied packets to IP header packet distribution function 202. IP header packet distribution function 202 distributes the packets to one of the processors 204 based on IP and TCP or UDP header information in the packet.

Figure 3:
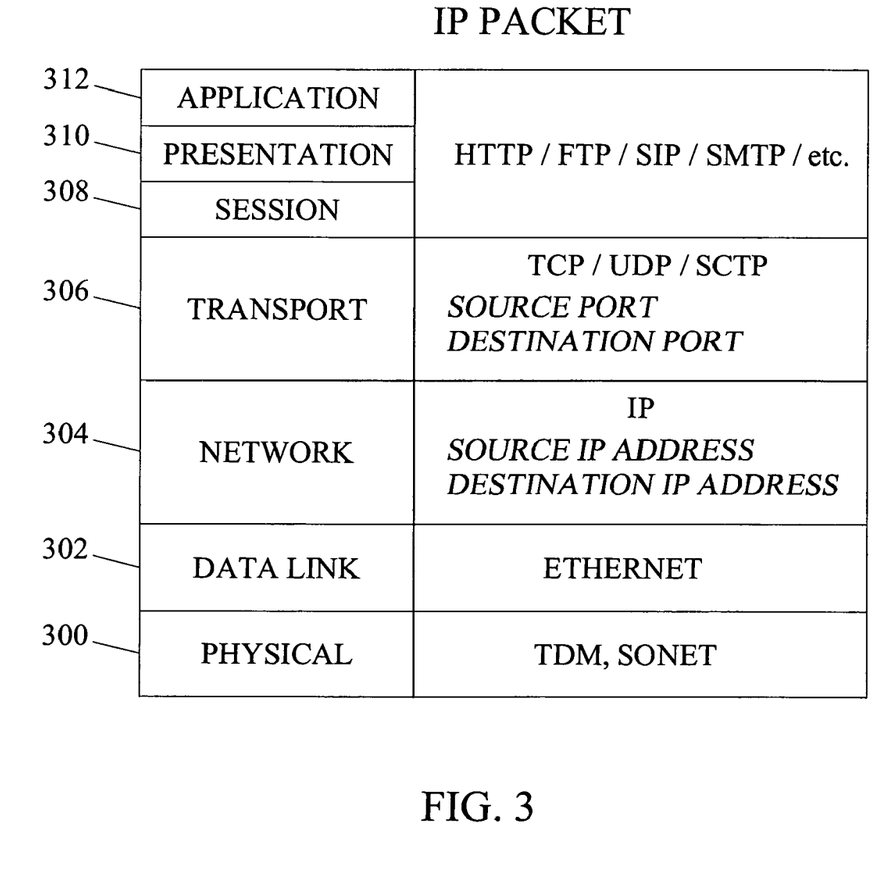
FIG. 3 is a protocol diagram illustrating the five layers in the stack of an IP packet.

FIG. 3 is a protocol diagram illustrating exemplary layers of an IP packet. According to the OSI model, the packet illustrated in FIG. 3 includes a physical layer 300, a data link layer 302, a network layer 304, a transport layer 306, a session layer 308, a presentation layer 310, and an application layer 312. Physical layer 300 carries physical layer information, such as TDM or SONET information. Data link layer 302 carries data link layer information, such as Ethernet information. Network layer 304 carries network layer information, such as source and destination IP address information. Transport layer information 306 stores transport layer information, such as TCP, UDP, or SCTP port information. Together, layers 308-312 carry application, presentation, and session layer information, such as HTTP, FTP, SIP, or SMTP information.

Session layer 308 is responsible for the creation, management, and termination of sessions between systems. A session may be described as a type of managed connection between systems for the purpose of a specific type of communication. For example, a session may be created for the purpose of user authentication or to initiate a file transfer. Session layer 308 is also responsible for coordinating the manner in which communication between systems takes place, also known as dialog control. In some sessions, only a single system may be allowed to communicate at any point in time, which may be referred to as a half-duplex session. In a half duplex session, session layer 308 may be responsible for determining which system is allowed to communicate and for how long. In other sessions, known as a full duplex sessions, both systems can communicate at the same time. If the communication stream were somehow interrupted, session layer 308 may be responsible for recognizing this and re-establishing the session. Examples of session layer protocols include Unix file system access, such as Network File System (NFS), local or remote database queries, such as Structured Query Language (SQL), client-server communication mechanisms such as remote Procedure Call (RPC), and Remote desktop sessions, such as X Windows.

Presentation layer 310 is primarily responsible for data representation and formatting, ensuring that data can be viewed correctly. These formats are sometimes referred to as the data syntax of the applications in use. For example, different systems may use different schemes to represent data including, but not limited to, ASCII, EBCIDC, or UNICODE. Because these schemes contain different character possibilities, presentation layer 310 may be responsible for ensuring that data are displayed in the correct or common format between the client and the server. Further to this, presentation layer 310 may be responsible for data compression and encryption. Examples of common presentation layer formats include text encoding formats, such as ASCII, EBCIDC, UNICODE, and RTF, video encoding formats such as MPEG, AVI, and Quicktime, graphic formats, such a JPEG and TIFF, and audio formats such as MIDI and MP3.

Application layer 312 is the top layer of the OSI model and is considered to be the place where the user interacts with the network. This interaction usually occurs by running a program, such as a web browser or a spreadsheet application. Typically, application layer 312 does not require extensive knowledge of the network in order to function properly. Instead, application layer 312 is capable of making a request (i.e. for data) and then determining what to do with the reply (i.e. the data that was requested). For example, in the case of a user browsing a website, a client application, such as a web browser, may make an HTTP request that is understood by a receiving application, such as a web server. It is appreciated that lower layers, such as layers 300-306, concern themselves with how data is actually encapsulated and transmitted. Examples of common application layer programs and services include word processor applications, web browser applications (e.g., HTTP), email clients, such as simple mail transfer protocol (SMTP), post office protocol version 3 (POP3), and Internet access message protocol (IMAP), remote terminal sessions, such as Telnet, and file transfer applications, such as file transfer protocol (FTP). Additional information regarding layers in the OSI model, including the above descriptions of exemplary session, presentation, and application layer functions can be found, *CCNA Study Guide* Chapter 01 by Dan DiNicolo, Aug. 25, 2005.

While the conventional network monitoring system illustrated in FIG. 2 is limited to distributing packets based on the information stored in layers 304 and 306 of an IP packet, information carried in session layer 308, presentation layer 310, and application layer 312 may be used by various embodiments of the subject matter described herein to monitor, identify and segregate IP traffic in a communications network. For example, HTTP information associated with session layer 312 may be used to identify and segregate IP traffic associated with the same HTTP session.

One problem with using information associated with the network and transport layer information in a packet to segregate traffic for network monitoring purposes occurs when a packet is tunneled. When a packet is tunneled across a network, the packet being tunneled is encapsulated in another packet to be transported across the network. For example, in mobile communications networks, such as general packet radio service (GPRS) network, the GPRS tunneling protocol (GTP) may be used to tunnel IP packets being transmitted between nodes, such as a serving GPRS support node (SGSN) and a gateway GPRS support node (GGSN). The outer or encapsulating IP packet for each packet being transmitted in each direction between the SGSN and GGSN may include the same source and destination IP addresses. Since the outer header of each packet includes the same IP address information, segregation cannot be performed based on the outer header.

Figure 4:
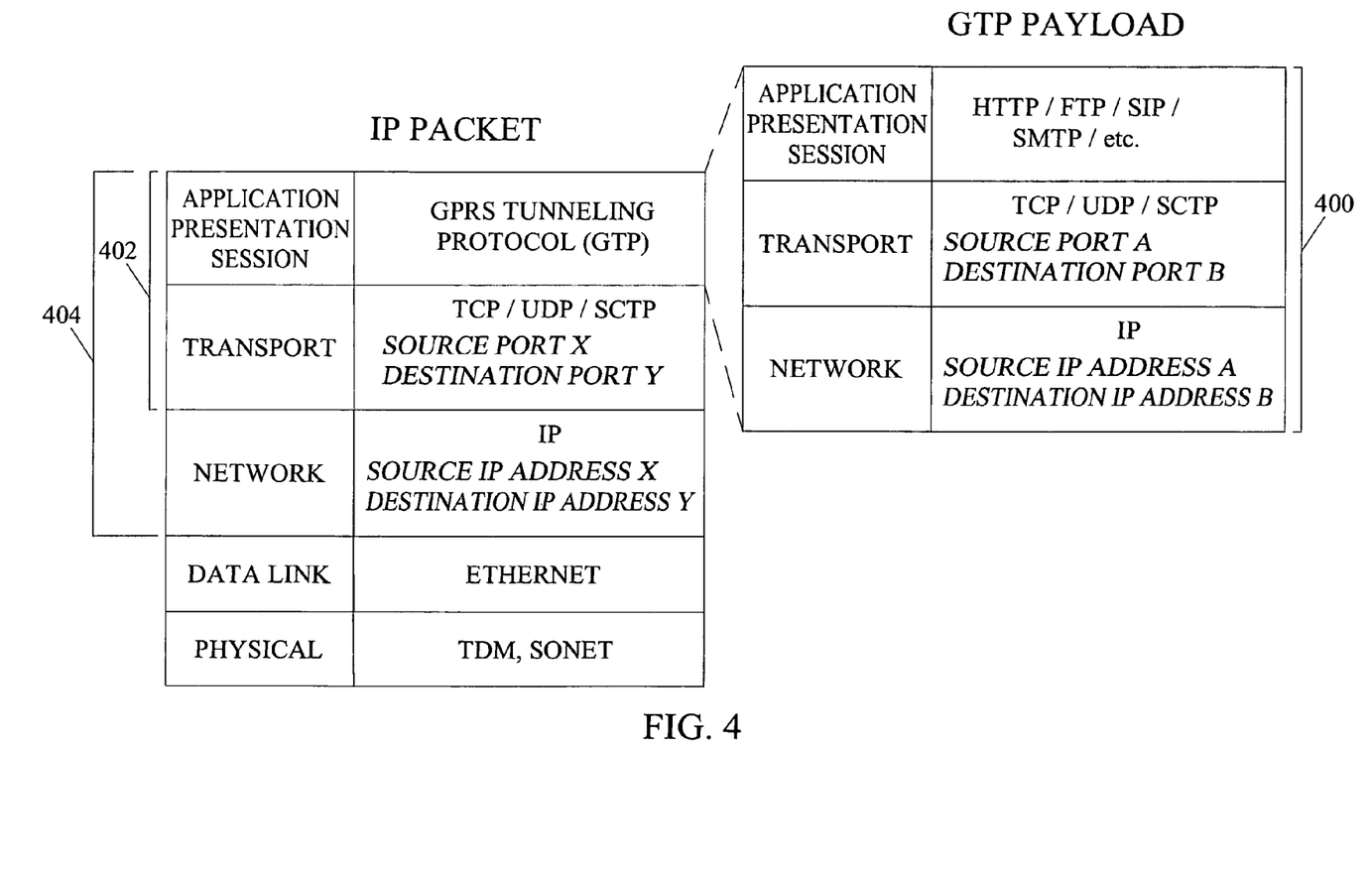
FIG. 4 is a block diagram illustrating both the information contained in the GTP encoded wrapper of an IP packet as well as the GTP decoded payload of an IP packet that may be used to distribute tunneled packets according to an embodiment of the subject matter described herein.

GTP is one example of a protocol for which it may be desirable to segregate traffic for network monitoring purposes using information other than that found in the outer header. FIG. 4 is a block diagram illustrating encapsulation of an IP packet using GTP. In FIG. 4, an original IP packet 400 is encapsulated in the payload portion 402 of an encapsulating IP packet 404. In the illustrated example, tunneled or encapsulated IP packet 400 contains the original IP address and SCTP, TCP, or UDP port information. Encapsulating IP packet 404 carries tunneled IP packet 400 in its payload portion 402. The network and transport layer header information of encapsulating IP packet 404 is the same for all packets traversing a tunneling network. Accordingly, the transport and network layer information in the encapsulating IP packet 404 cannot be used to distribute monitored messages among multiple processors.

Figure 5:
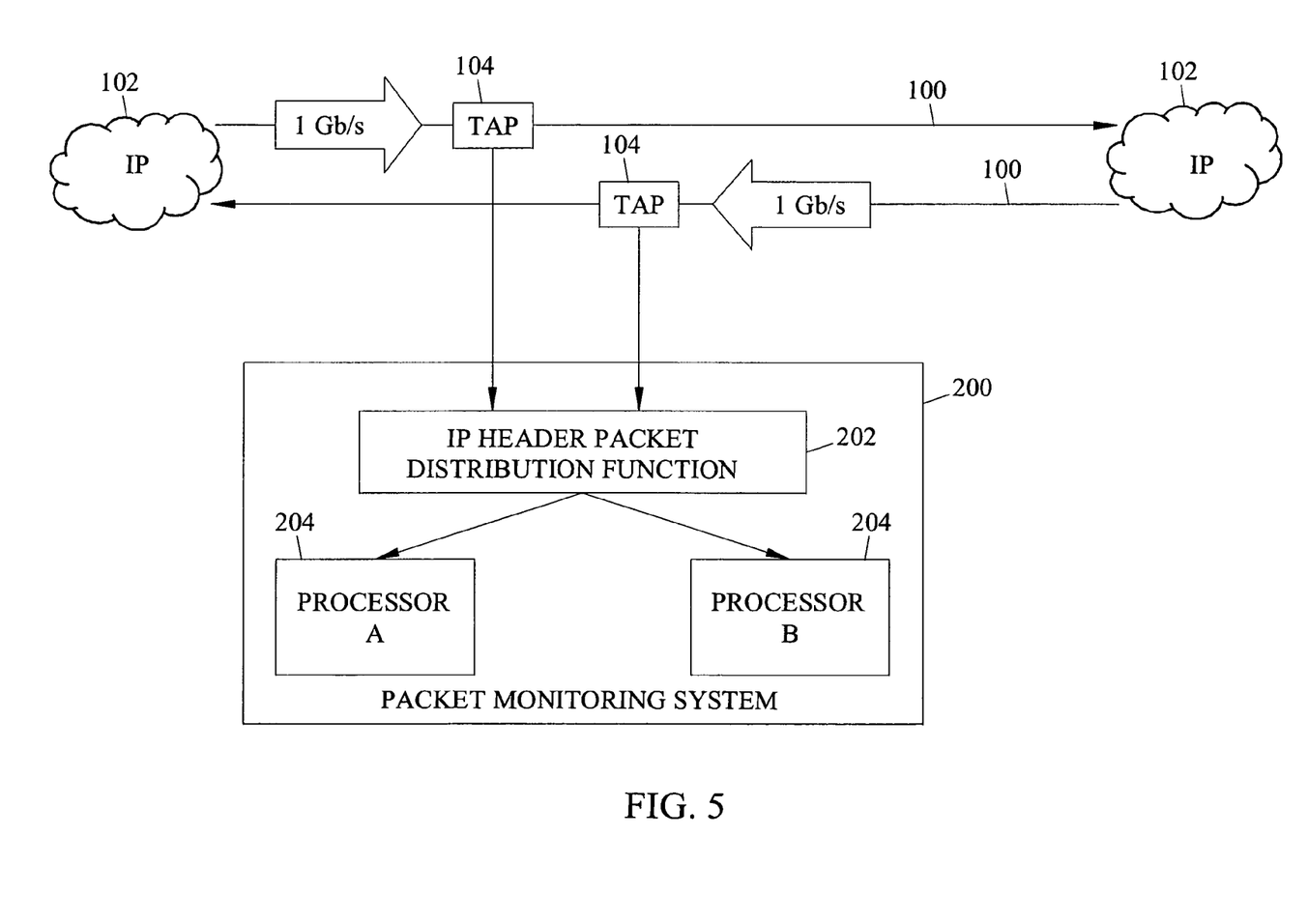
FIG. 5 is a block diagram of a high bandwidth IP network illustrating a tap on each direction of an Ethernet connection wherein tunneled IP packets are distributed between two processors based only on the tap from which each packet is copied.

FIG. 5 is a block diagram of a network that illustrates one possible solution for monitoring tunneled IP packets. In FIG. 5, IP header packet distribution function 202 classifies packets based on network and transport layer header information, as described above. Since all packets going in one direction will have the same headers, all of these packets will be assigned to one processor, such as processor A 204. Since all packets traveling in the opposite direction will have a different transport and network layer header information, these packets may be processed by a different processor, such as processor B 204. It may be desirable to achieve a finer granularity segregation than simply sending all packets traveling in one direction to one processor and all packets traveling in the other direction to another processor. However, using conventional transport and network layer header information, such fine granularity segregation cannot be achieved.

Figure 6:
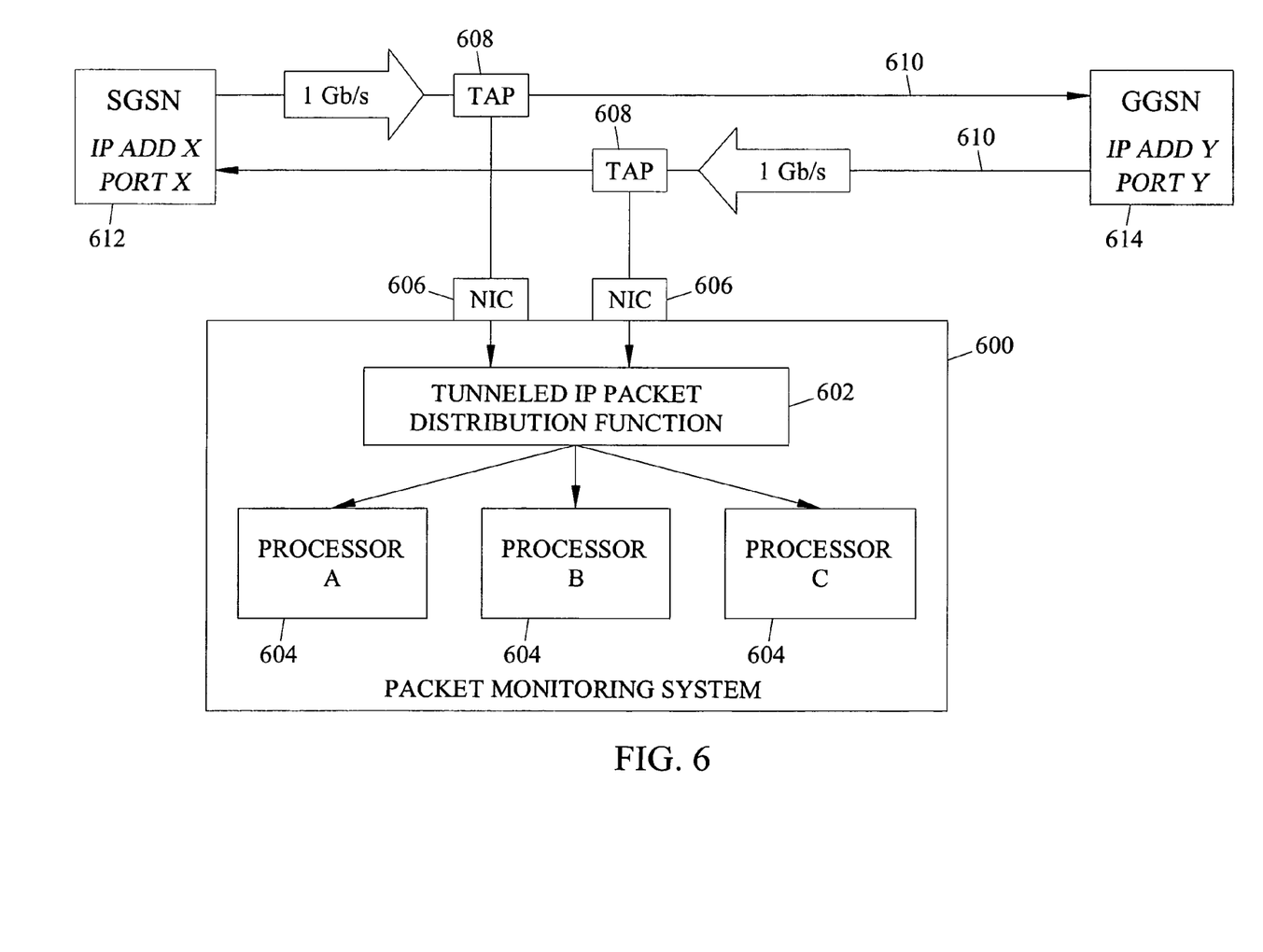
FIG. 6 is a block diagram of a high bandwidth IP network illustrating a tap on each direction of an Ethernet connection wherein tunneled IP packets are distributed among a plurality of non-hierarchically structured processors based on the source and destination IP addresses contained in the GTP decoded payloads of the tunneled IP packets according to an embodiment of the subject matter described herein.

FIG. 6 is a block diagram illustrating an exemplary monitoring system for classifying and processing tunneled IP packets according to an embodiment of the subject matter described herein. Referring to FIG. 6, a packet monitoring system 600 may include a tunneled packet distribution function 602 for segregating packets based on tunneled protocol address information and a plurality of processors 604 for processing the distributed packets. Tunneled IP packet distribution function 602 may read tunneled protocol address information encapsulated in payload portion of a received IP packet and may distribute the packets to one or more downstream applications for processing based on the tunneled protocol address information. Each processor 604 may implement one or more packet classification and/or processing functions. For example, each processor 604 may implement deep packet classification for classifying or correlating packets based on application/presentation/session layer information. In addition, each processor 604 may implement a network monitoring function for correlating and processing IP packets.

According to one embodiment of the subject matter described herein, a tunneled packet distribution function 602 may strip or truncate information from a copied IP packet prior to distributing the packet to one of processors 204. Such information stripping/truncation is advantageous in that it may reduce bandwidth and processing resource requirements downstream from the distribution function. For example, if a downstream processor/classification function is only interested in counting the number of HTTP related packets that are observed in a communications network, then payload information associated with observed HTTP packets may be stripped out/truncated by the distribution function. In this manner, only a minimal amount of information sufficient to identify a packet as being related to an HTTP transaction need be communicated between the distribution function and the processor/classification function.

In the illustrated example, monitoring system 600 includes network interfaces 606 for receiving packets from the network. Each network interface 606 may be coupled to one or more taps or probes 608 that copy packets that traverse a high bandwidth IP network. Taps 608 may be implemented using link monitoring probes, such as those used to copy signaling messages in telecommunications networks.

Link monitoring probes or taps 608, in the illustrated example, are coupled to high bandwidth Ethernet links 610, that connect a serving GPRS support node 612 and a gateway GPRS support node 614. SGSN 612 and GGSN 614 may use the GTP protocol for communicating packets. Accordingly, the outer headers of packets transmitted between SGSN 612 and GGSN 614 may always have the IP addresses and UDP ports X and Y as illustrated in FIG. 6. However, packets sent from other nodes and packets originated by applications associated with SGSN 612 and GGSN 614 may include different inner header IP address and transport layer port information. It may be desirable to segregate packets based on this information. Tunneled IP packet distribution function 602 may distribute packets to a downstream application based on the tunneled protocol network and transport layer information. For example, tunneled IP packet distribution function 602 may utilize transport and/or network layer information from GTP payload 400 illustrated in FIG. 4 to distribute tunneled GTP packets to one of processors 604.

Figure 7:
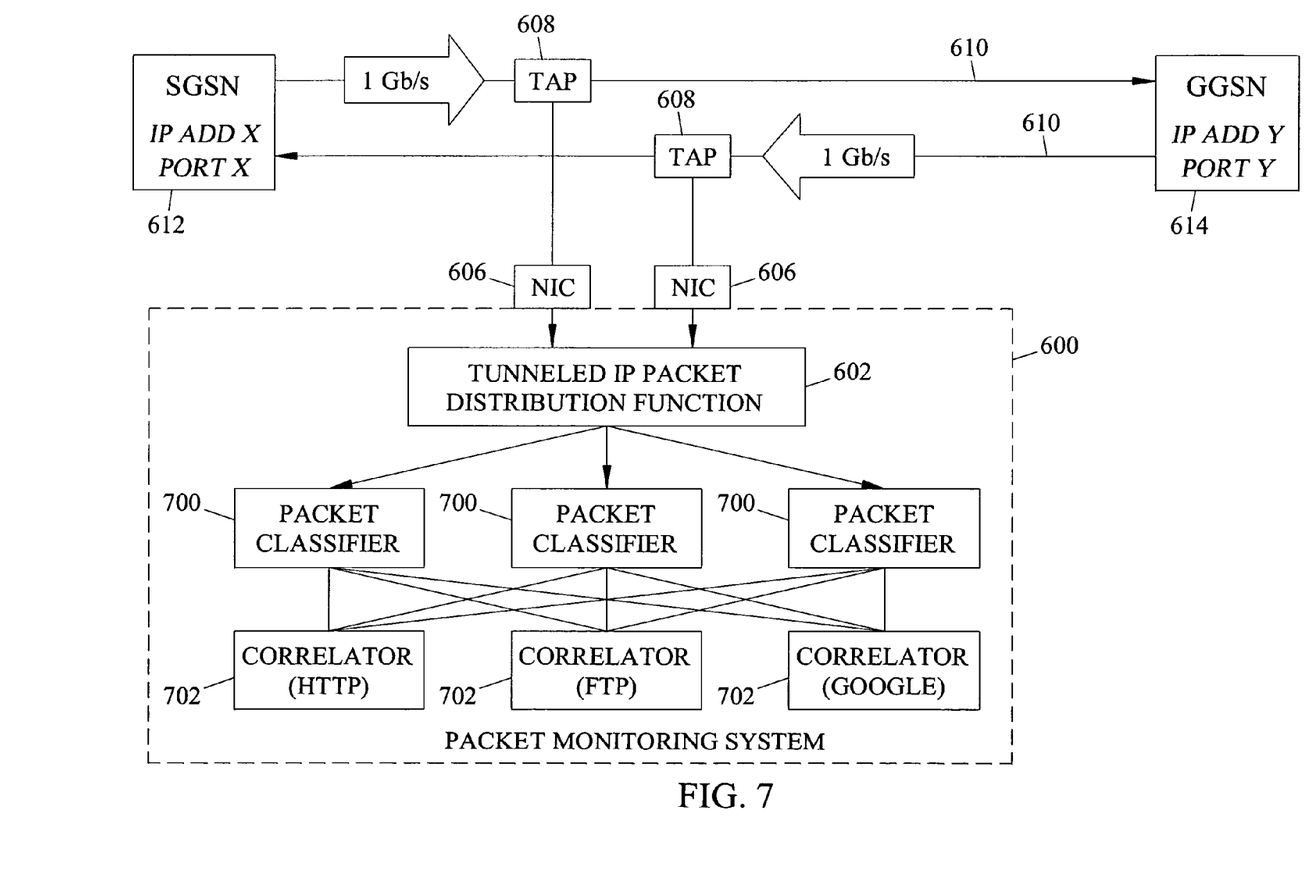
FIG. 7 is a block diagram of a high bandwidth IP network illustrating a tap on each direction of an Ethernet connection wherein tunneled IP packets are distributed, classified, tagged and distributed among a plurality of hierarchically structured processors based on information contained in the GTP decoded payloads of the IP packets.

In addition to utilizing tunneled packet network and transport layer information to distribute tunneled packets, the present subject matter may utilize application, presentation, and/or session information from the tunneled packet to distribute the packet. Classification of a tunneled packet based on application, presentation, and/or session layer information is referred to herein as deep packet classification. FIG. 7 is a block diagram where network monitoring system 600 implements deep packet classification and correlation based on application, presentation, and session layer information according to an embodiment of the subject matter described herein. Referring to FIG. 7, network monitoring system 600 includes a plurality of packet classifiers 700 for performing deep packet classification services for received packets. Deep packet classification services may include classifying packets based on classification criteria and/or rules. In one exemplary implementation, each deep packet classifier 700 may classify packets based on application/presentation/session layer protocol information, such as HTTP information, FTP information, service provider identifiers, content provider identifiers, or other suitable application, presentation, or session layer information. Network monitoring system 600 further includes a plurality of correlators 702 for correlating packets received from classifier 700. Each correlator 702 may correlate packets into records, such as communications detail records (abbreviated herein as "xDRs"), such as call detail records (CDRs) or transaction detail records (TDRs). Correlated packets, CDRs, and TDRs may be stored by correlator 702 and provided to external applications, such as fraud detection applications, billing applications, network traffic analysis applications, network diagnostic applications, usage measurement applications, billing verification applications, audit applications, and any other application that requires correlated packet information. In the illustrated example, correlators are included for the hypertext transfer protocol (HTTP), the file transfer protocol (FTP), and for packets originating from a common content provider, such as Google™.

The subject matter described herein is not limited to correlating packets according to the protocols illustrated in FIG. 7. For example, additional correlators may be included to correlate telecommunications signaling messages protocols, such as any of the SS7 family of protocols, including mobile application part (MAP), transaction capabilities applications part (TCAP), ISDN user part (ISUP), session initiation protocol (SIP), or other suitable application layer protocol used in telecommunications networks.

In one implementation, each packet classifier 700 may tag packets based on the identified protocol. Tags may be used by correlators 702 to correlate packets. For example, a packet classifier may tag an HTTP packet to indicate that the packet contains HTTP information and forward the packet to all correlators 702. In an alternate implementation, each packet classifier may distribute each packet to the appropriate correlator for processing, eliminating the need for tagging the packets.

Figure 8:
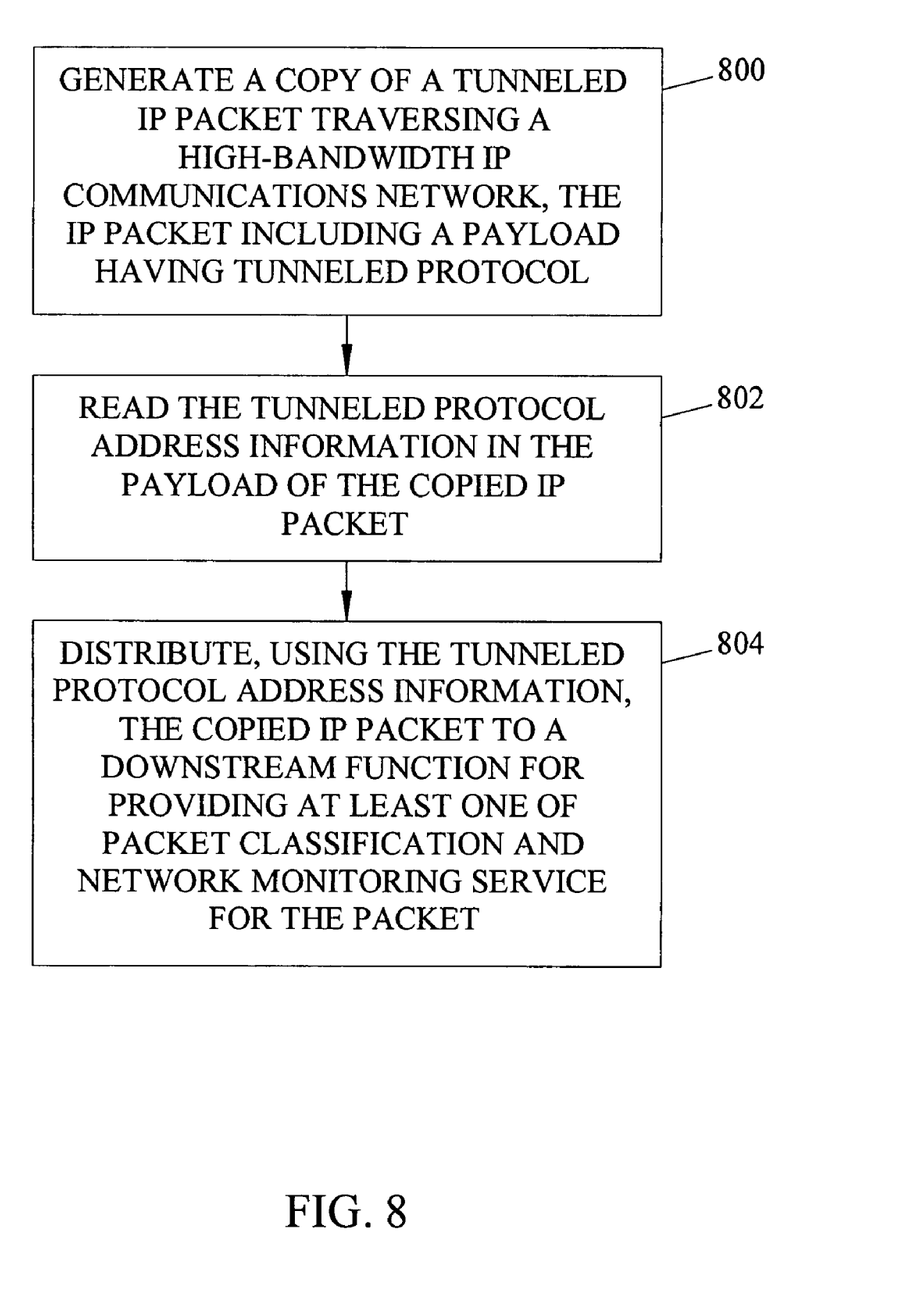
FIG. 8 is a flow chart illustrating an exemplary process for distributing tunneled IP packets traversing a high bandwidth IP network according to an embodiment of the subject matter described herein.

FIG. 8 is a flow chart illustrating exemplary overall steps for distributing tunneled packets according to an embodiment of the subject matter described herein. Referring to FIG. 8, in step 800, a copy of a tunneled IP packet traversing a high bandwidth communications network is generated. In step 802, tunneled protocol address information in a payload portion of the copy packet is read. In step 804, the packet is distributed, using the tunneled protocol address information, to a function that provides at least one of packet classification and network monitoring service for the packet, where exemplary network monitoring services may include, but are not limited to, call detail record generation, transaction detail record generation, charging detail record generation, fraud detection, usage and measurements, traffic analysis, billing, billing verification, audit services, and network diagnostic services.

One advantage of the subject matter described herein includes scalability. As the amount of IP traffic continues to increase, more and more processors are needed in order to effectively monitor that traffic in real time. The hierarchical structure described herein allows more processors to be added as needed.

Another advantage includes increased IP traffic segregation granularity. By examining information contained in within the tunneled payload portion of packets in an IP packet stream, the present network monitoring system is able to segregate the IP traffic stream into multiple, narrowly defined categories. For example, a monitored broadband IP stream that includes a variety of traffic types may be effectively broken down or segregated into multiple, narrower-band streams, where each narrower-band stream is associated with a particular traffic type. How general or specific an operator wishes to segregate the monitored IP traffic is up to the operator.

It will be understood that various details of the invention may be changed without departing from the scope of the subject matter described herein. Furthermore, the foregoing description is for the purpose of illustration only, and not for the purpose of limitation.

What is claimed is:

1. A method for monitoring tunneled Internet protocol (IP) traffic in a communications network, the method comprising:
    at a network tap located between general packet radio service (GPRS) nodes:
    (a) generating a copy of a tunneled IP packet stream that includes a plurality of IP packets traversing an IP communications network, each IP packet in the tunneled IP packet stream including an outer packet header including non-tunneled protocol address information, an outer packet payload carrying a tunneled packet having tunneled protocol address information, wherein the tunneled packets are not uniquely identifiable based on their non-tunneled protocol address information;
    (b) reading the tunneled protocol address information; and
    (c) segregating, using an amount of the tunneled protocol address information sufficient to identify an IP packet, the tunneled IP packet stream into a plurality of substreams by truncating the copied IP packets and distributing the plurality of substreams including the truncated IP packets to one or more processors for providing at least one of packet classification and network monitoring service for the truncated IP packets, wherein truncating the copied IP packets includes removing at least one of application layer information, presentation layer information, and session layer information from the tunneled IP packets.

2. The method of claim 1 wherein the payload comprises a general packet radio service (GPRS) tunneling protocol (GTP) payload and wherein reading the tunneled protocol address information in the payload includes reading IP address and port information from the GTP payload.

3. The method of claim 2 wherein the tunneled protocol address information comprises information selected from a group consisting of: source and destination IP address, source and destination transmission control protocol (TCP) port values, source and destination user datagram protocol (UDP) port values, and source and destination stream control transmission protocol (SCTP) port values.

4. The method of claim 1 wherein distributing the substreams comprises directing one of the truncated IP packets to a processor to which truncated IP packets associated with the same session as the one truncated IP packets have been directed.

5. The method of claim 1 wherein distributing the substreams includes distributing one of the truncated IP packets to one of a plurality of packet classification functions and wherein the method further comprises, at the packet classification function:
    (a) classifying the one truncated IP packet according to a predetermined set of rules; and
    (b) directing the one truncated IP packet to one or more functions according to its classification.

6. The method of claim 5 wherein classifying the one truncated IP packet includes associating a classification tag with the one truncated IP packet.

7. The method of claim 5 wherein classifying the one truncated IP packet according to a predetermined set of rules comprises classifying the one truncated IP packet according to at least one of the application layer information, the session layer information, and the presentation layer information of the one truncated IP packet.

8. The method of claim 5 wherein classifying the one truncated IP packet according to a predetermined set of rules comprises classifying the one truncated IP packet according to a content provider associated with the one truncated packet.

9. The method of claim 5 wherein classifying the one truncated IP packet according to a predetermined set of rules comprises classifying the one truncated IP packet according to a service provider associated with the one truncated packet.

10. The method of claim 5 comprising:
    (a) correlating the classified IP packets; and (b) generating a correlated data structure relating to the classified IP packets.

11. The method of claim 10 wherein the correlated data structure comprises a communications detail record (xDR).

12. A system for monitoring tunneled Internet protocol (IP) traffic in a communications network, the system comprising:
   (a) an IP network probe comprising a network tap locatable between general packet radio service (GPRS) nodes for generating a copy of a IP packet stream that includes a plurality of tunneled IP packets traversing an IP communications network, each IP packet having an outer packet header including non-tunneled protocol address information, an outer packet payload carrying a tunneled packet including tunneled protocol address information, wherein the tunneled packets are not uniquely identifiable based on their non-tunneled protocol address information;
   (b) a tunneled IP packet distribution function for reading an amount of the tunneled protocol address information and for segregating the tunneled IP packet stream into a plurality of substreams by truncating the copied IP packets and distributing the plurality of substreams including the truncated IP packets based on the address information extracted from the IP packet payload, wherein truncating the copied IP packets includes removing at least one of application layer information, presentation layer information, and session layer information from the tunneled IP packets; and
   (c) a plurality of processors for receiving the IP packets from the tunneled IP packet distribution function and for providing at least one of a packet classification service and a network monitoring service for the truncated IP packets.

13. The system of claim 12 wherein the tunneled protocol address information comprises general packet radio service (GPRS) tunneling protocol (GTP) address information and wherein the tunneled IP packet distribution function is adapted to read the tunneled protocol address information from the GTP header.

14. The system of claim 12 wherein the tunneled protocol address information comprises information selected from a group consisting of: source and destination IP address, source and destination transmission control protocol (TCP) port values, source and destination user datagram protocol (UDP) port values, and source and destination stream control transmission protocol (SCTP) port values.

15. The system of claim 12 wherein the plurality of functions includes a deep packet classifier for classifying IP packets according to a predetermined set of rules and directing the IP packets to one or more processors according to their classification.

16. The system of claim 15 wherein the deep packet classifier classifies each IP packet according to at least one of application layer information, session layer information, and presentation layer information from the tunneled IP packet.

17. The system of claim 15 wherein the deep packet classifier classifies each packet according to its content provider.

18. The system of claim 15 wherein the deep packet classifier classifies each packet according to its service provider.

19. The system of claim 15 including a correlation function for correlating the classified IP packets, for generating a correlated data structure relating to the classified IP packets, and for providing the correlated data structure to other applications.

20. The system of claim 19 wherein the correlated data structure comprises a communications detail record (xDR).

21. A computer program product comprising computer executable instructions embodied in a non-transitory computer readable medium for performing steps comprising:
   at a network tap located between general packet radio service (GPRS) nodes:
   (a) generating a copy of a tunneled IP packet stream that includes a plurality of IP packets traversing an IP communications network, each IP packet in the tunneled IP packet stream including an outer packet header including non-tunneled protocol address information, an outer packet payload carrying a tunneled packet having tunneled protocol address information, wherein each of the tunneled packets are not uniquely identifiable based on their non-tunneled protocol address information;
   (b) reading the tunneled protocol address information; and
   (c) segregating, using an amount of the tunneled protocol address information sufficient to identify an IP packet, the tunneled IP packet stream into a plurality of substreams by truncating the copied IP packets and distributing the plurality of substreams including the truncated IP packets to one or more processors for providing at least one of packet classification and network monitoring service for the truncated IP packets, wherein truncating the copied IP packets includes removing at least one of application layer information, presentation layer information, and session layer information from the tunneled IP packets.

* * * * *